Jan. 28, 1958　　　L. L. BROWN　　　2,821,444
BEARING RETAINING MEANS
Filed Feb. 23, 1955
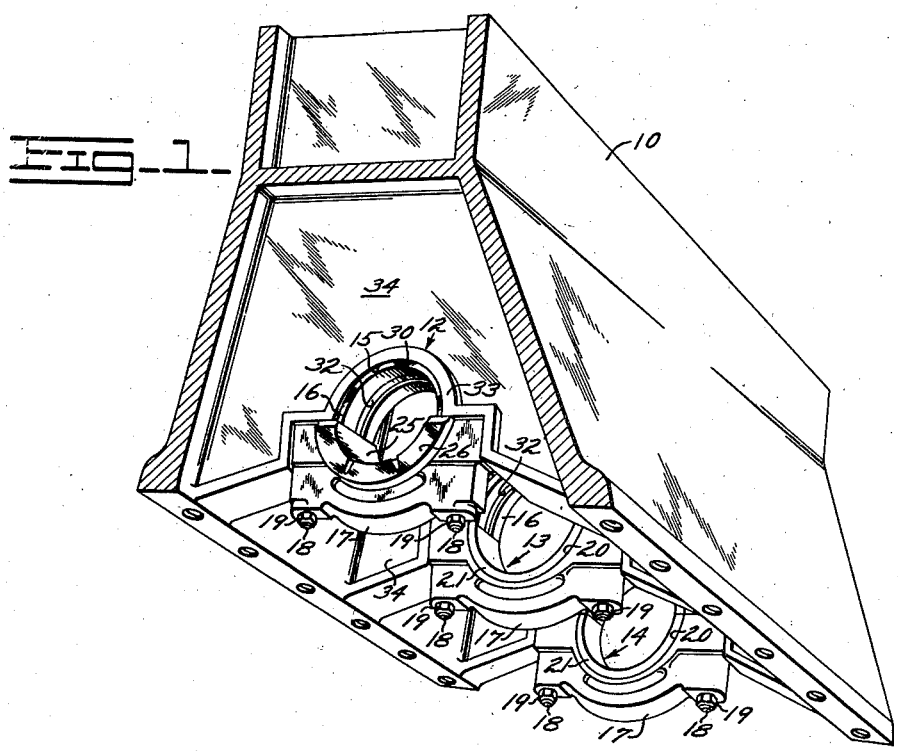
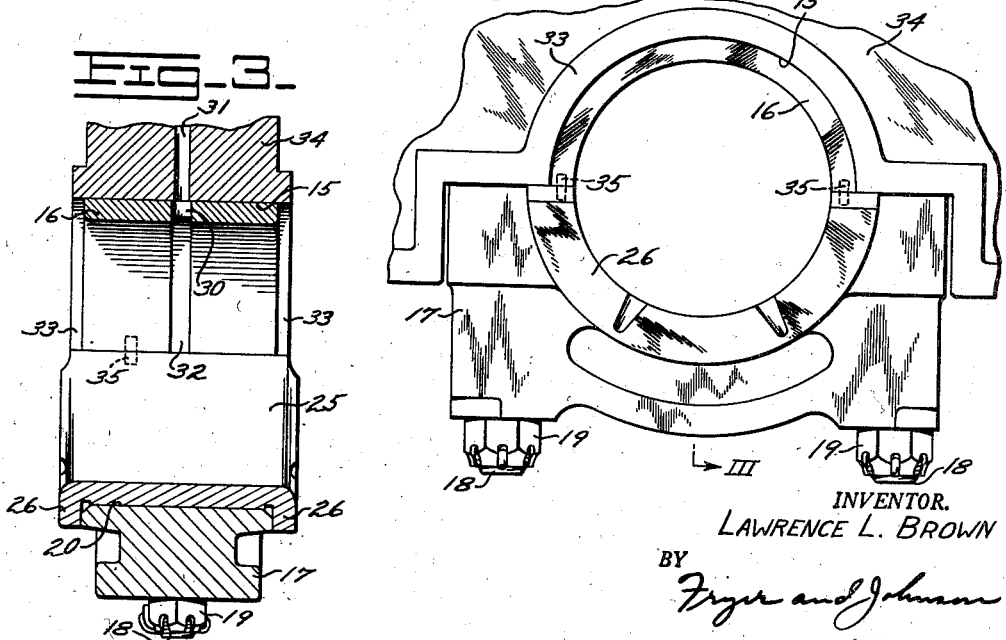
INVENTOR.
LAWRENCE L. BROWN
BY
ATTORNEYS

United States Patent Office 2,821,444
Patented Jan. 28, 1958

2,821,444
BEARING RETAINING MEANS

Lawrence L. Brown, Peoria Heights, Ill., assignor to Caterpillar Tractor Co., Peoria, Ill., a corporation of California Application February 23, 1955, Serial No. 489,851

2 Claims. (Cl. 308—23)

This invention relates to improvements to insert type bearings and particularly to means for mounting insert type main bearings to support the crankshaft of an internal combustion engine or the like.

Insert type bearings comprise essentially a semi-cylindrical shell of bearing material received in a seat in the engine block and a cooperating semi-cylindrical shell of bearing metal carried in a cap secured to the engine block, and it is necessary to retain the bearing shells against rotation.

It is a common practice to prevent rotation of the bearing shells relative to the engine block in the bearing cap by upsetting a short length of each bearing shell at the line of contact between the upper and lower shells to form outwardly extending tabs which project into notches formed in the semi-cylindrical surfaces of the block or cap. These notches and tabs are difficult and expensive to form. Furthermore, the tabs materially reduce the bearing area and, hence, the bearing capacity.

A second commonly used method of preventing rotation of the bearing shells is to insert dowels radially through the bearing shells into bores provided in the engine block or cap. In addition to reducing bearing area as previously described, this dowel method is generally unsatisfactory due to inherent movement of the dowel in the bearing during operation which tends to enlarge the clearances between the shell and the dowel to the point of complete failure of the bearing shell.

It is the object of the present invention, therefore, to provide a means for retaining the main bearing shells of an engine crankshaft in position which have no adverse effects upon the capacity of the bearings.

In the drawings:

Fig. 1 is a fragmentary view in perspective of an engine block showing the relationship of the bearings of the present invention thereto, Fig. 2 is a fragmentary view in side elevation of the main bearing to which the present invention is directed, and, Fig. 3 is a view taken along the line III—III of Fig. 2.

As is best disclosed in Fig. 1, the spaced journals provided on the crankshaft, not shown, of an internal combustion engine are normally supported in an engine block 10 by a plurality of spaced bearings generally indicated at 12, 13 and 14. The engine block is provided with a semi-cylindrical surface 15 at each journal location to receive the cooperating semi-cylindrical upper shell 16 of bearing material. A bearing cap 17 is secured as by bolts 18 and nuts 19 to the engine block at each journal location and each cap is provided with a semi-cylindrical surface portion 20 to receive a semi-cylindrical lower shell of bearing material as indicated at 21 so that the upper and lower bearing shells just described completely surround the crankshaft journal and are supported in the engine block by caps 17.

With the upper and lower shells assembled in the engine block, an aperture 30 in each upper shell registers with one of a plurality of drilled passages 31 in the engine block. A groove 32 in each upper bearing shell intersects aperture 30 so that lubricant supplied to passages 31 by pump means, not shown, is distributed to the contacting surfaces of the bearings and the crankshaft journals.

It is a practice well known in the art to provide flanges as indicated at 26 on the lower shell 25 of selected bearings as, for example, bearing 12. The crankshaft cheeks adjacent these flanges are provided with bearing surfaces such that the flanges 26 absorb thrust loads imposed on the crankshaft during operation.

In accordance with the present invention, rotation of the bearing shells is prevented by providing a flange 33 on each side of the partitioning walls 34 of the engine block. This flange abuts the flanges 26 of the lower bearing shell 25 to restrain said lower shell against rotative movement. Since the lower edges of upper shells 16 contact the upper edges of lower shells 25 when assembled in the engine, the upper shell is likewise restrained against rotative movement.

Dowels 35 are provided between the edges of the upper and lower shells to prevent longitudinal shifting of the upper shell with respect to the lower shell and the drilled lubrication passages 31, but in this case, the dowels are between the edges of the bearing and since they are normally subjected to very small loads, they may be of very small diameter which does not materially effect the strength of the shells.

I claim:

1. In bearing means which includes the combination of a two part cylindrical bearing support, two semi-cylindrical bearing shells therein, and a shaft journalled in said shells, the improvement which comprises a radially projecting flange at each end of one of said bearing shells, and flanges formed on the opposite part of the bearing support in positions to abut the ends of the flanges on the bearing shell to prevent it from rotating in the bearing support.

2. In bearing means which includes the combination of a two part cylindrical bearing support, two semi-cylindrical bearing shells therein, and a shaft journalled in said shells, the improvement which comprises a radially projecting flange at each end of one of said bearing shells, and flanges formed on the opposite part of the bearing support in positions to abut the ends of the flanges on the bearing shell to prevent it from rotating in the bearing support, the flanges on said bearing shell also serving as thrust bearings for a part on said shaft.

References Cited in the file of this patent

UNITED STATES PATENTS

| | | |
|---|---|---|
| 516,489 | Hunt | Mar. 13, 1894 |
| 1,282,672 | Blumberg | Oct. 22, 1918 |
| 1,283,803 | Kirkham | Nov. 5, 1918 |
| 1,931,231 | Luker | Oct. 17, 1933 |